(12) United States Patent
Jamadagni et al.

(10) Patent No.: US 10,284,319 B2
(45) Date of Patent: May 7, 2019

(54) METHOD AND APPARATUS FOR MULTIPLEXING MACHINE TYPE COMMUNICATION DATA OF MULTIPLE MTC DEVICES IN A WIRELESS NETWORK ENVIRONMENT

(75) Inventors: Satish Nanjunda Swamy Jamadagni, Bangalore (IN); Pradeep Krishnamurthy Hirisave, Bangalore (IN); Sarvesha Anegundi Ganapathi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1058 days.

(21) Appl. No.: 13/879,210

(22) PCT Filed: Oct. 13, 2011

(86) PCT No.: PCT/KR2011/007639
§ 371 (c)(1),
(2), (4) Date: Apr. 12, 2013

(87) PCT Pub. No.: WO2012/050383
PCT Pub. Date: Apr. 19, 2012

(65) Prior Publication Data
US 2013/0195087 A1    Aug. 1, 2013

(30) Foreign Application Priority Data
Oct. 13, 2010  (IN) ........................... 3029/CHE/2010

(51) Int. Cl.
*H04J 3/16*       (2006.01)
*H04W 48/08*   (2009.01)
(Continued)

(52) U.S. Cl.
CPC ........... *H04J 3/1694* (2013.01); *H04W 48/08* (2013.01); *H04W 28/06* (2013.01); *H04W 72/042* (2013.01); *H04W 72/0446* (2013.01)

(58) Field of Classification Search
None
See application file for complete search history.

(56) References Cited

U.S. PATENT DOCUMENTS 5,533,004 A *   7/1996   Jasper ................. H04B 7/2659
                                                           370/204
5,974,032 A *  10/1999   Snowden ........... H04B 7/18532
                                                           370/316
(Continued)

FOREIGN PATENT DOCUMENTS

KR          10-0758860 B1       9/2007

OTHER PUBLICATIONS

S1-093183, 3GPP TSG-SA1 #47, Contribution to TS 22.368—Chapter 4.
(Continued)

*Primary Examiner* — Christopher T Wyllie
(74) *Attorney, Agent, or Firm* — Jefferson IP Law, LLP

(57) ABSTRACT

A method and a system of multiplexing Machine Type Communication (MTC) data of MTC devices over a single radio block period are provided. The method includes providing, by a base station, resource information to a plurality of MTC devices, where the resource information includes a time slot allocated to the plurality of MTC devices in each frame of a radio block period, a temporary flow identifier, and the sub-block index information. The method further includes packing MTC data associated with each of the plurality of MTC devices in a data packet. Furthermore, the method includes multiplexing the data packet including the MTC data associated with the plurality of MTC devices in
(Continued)

downlink over the time slot allocated in each frame of the radio block period.

12 Claims, 11 Drawing Sheets

(51) Int. Cl.
  *H04W 28/06* (2009.01)
  *H04W 72/04* (2009.01)

(56) References Cited

U.S. PATENT DOCUMENTS

| | | | | |
|---|---|---|---|---|
| 6,301,238 | B1* | 10/2001 | Hagerman | H01Q 3/26 370/336 |
| 7,440,422 | B1* | 10/2008 | Holma | H04B 7/2643 370/278 |
| 2002/0041583 | A1 | 4/2002 | Lintulampi et al. | |
| 2002/0105940 | A1* | 8/2002 | Forssell | H04L 1/1635 370/349 |
| 2002/0122513 | A1* | 9/2002 | Oksala | H04W 52/52 375/345 |
| 2002/0150058 | A1* | 10/2002 | Kim | H04B 7/2656 370/280 |
| 2003/0225892 | A1* | 12/2003 | Takusagawa | H04L 29/12311 709/227 |
| 2004/0057407 | A1* | 3/2004 | Balachandran | H04W 72/0446 370/336 |
| 2004/0100920 | A1* | 5/2004 | Ball | H04W 52/04 370/318 |
| 2004/0233939 | A1* | 11/2004 | Li | H04B 7/2612 370/537 |
| 2005/0074030 | A1* | 4/2005 | Cho | H04W 99/00 370/474 |
| 2005/0095985 | A1* | 5/2005 | Hafeoz | H04L 25/03178 455/67.11 |
| 2005/0271066 | A1* | 12/2005 | Valadarsky | H04L 69/04 370/401 |
| 2006/0116149 | A1* | 6/2006 | Dunn | H04W 84/08 455/518 |
| 2006/0120274 | A1* | 6/2006 | Mansour | H04J 13/0048 370/209 |
| 2007/0002823 | A1* | 1/2007 | Skov Andersen | H04B 7/2656 370/349 |
| 2007/0009022 | A1 | 1/2007 | Chen | |
| 2007/0073535 | A1* | 3/2007 | Chen | G10L 19/24 704/221 |
| 2007/0091810 | A1* | 4/2007 | Kim | H04L 1/1635 370/236 |
| 2007/0104135 | A1* | 5/2007 | Pecen | H04W 72/042 370/329 |
| 2007/0178916 | A1* | 8/2007 | Sorbara | H04L 1/0009 455/458 |
| 2007/0274288 | A1* | 11/2007 | Smith | H04L 5/0092 370/351 |
| 2008/0137683 | A1* | 6/2008 | Xie | H04W 72/005 370/432 |
| 2008/0144600 | A1* | 6/2008 | Anderson | H04W 28/06 370/350 |
| 2008/0293425 | A1* | 11/2008 | Yuen | H04B 7/2656 455/450 |
| 2009/0016290 | A1* | 1/2009 | Chion | H04W 72/1289 370/329 |
| 2009/0147724 | A1* | 6/2009 | Nimbalker | H04L 1/0069 370/315 |
| 2009/0185577 | A1* | 7/2009 | Kishiyama | H04L 1/0003 370/465 |
| 2010/0040170 | A1* | 2/2010 | Qu | H04L 27/02 375/298 |
| 2010/0074196 | A1* | 3/2010 | Chion | H04W 8/26 370/329 |
| 2010/0265842 | A1* | 10/2010 | Khandekar | H04W 72/0433 370/252 |
| 2010/0278106 | A1* | 11/2010 | Kim | H04L 5/0007 370/328 |
| 2011/0010610 | A1* | 1/2011 | Boariu | H04W 12/06 714/807 |
| 2011/0069683 | A1* | 3/2011 | Kohyama | H04L 5/0007 370/336 |
| 2011/0201344 | A1* | 8/2011 | Ryu | H04W 4/70 455/450 |
| 2011/0201365 | A1* | 8/2011 | Segura | H04W 4/70 455/466 |
| 2011/0268046 | A1* | 11/2011 | Choi | H04L 5/0007 370/329 |
| 2011/0270973 | A1* | 11/2011 | Liao | H04L 41/0681 709/224 |
| 2011/0292893 | A1* | 12/2011 | Lee | H04W 74/002 370/329 |
| 2011/0299492 | A1* | 12/2011 | Lee | H04W 4/00 370/329 |
| 2011/0310854 | A1* | 12/2011 | Zou | H04W 74/0833 370/336 |
| 2012/0020304 | A1* | 1/2012 | Hole | H04W 52/0216 370/329 |
| 2012/0026924 | A1* | 2/2012 | Zhang | H04W 72/1289 370/329 |
| 2012/0033613 | A1* | 2/2012 | Lin | H04W 74/085 370/328 |
| 2012/0039253 | A1* | 2/2012 | Wang | H04W 72/1263 370/328 |
| 2012/0083283 | A1* | 4/2012 | Phan | H04W 72/048 455/450 |
| 2012/0093098 | A1* | 4/2012 | Charbit | H04W 72/04 370/329 |
| 2012/0198520 | A1* | 8/2012 | Cha | H04L 63/20 726/3 |
| 2013/0051228 | A1* | 2/2013 | Kim | H04L 47/115 370/230 |
| 2013/0195087 | A1* | 8/2013 | Jamadagni | H04W 48/08 370/336 |
| 2013/0286957 | A1* | 10/2013 | Bucknell | H04W 4/70 370/329 |

OTHER PUBLICATIONS

3GPP TS 22.368 V2.0.0, 3rd Generation Partnership Project; Technical Specification Group Service and System Aspects; Service Requirements for Machine-type Communications; Stage 1, See the sections 4-7.

* cited by examiner

| PAYLOAD TYPE | RRBP | S/P | USF | | |
|---|---|---|---|---|---|
| PR | | GROUP TFI 552 | | | FBI |
| | BSN | | | | |
| LENGTH INDICATOR 554 | | | | M | E |
| SUB-BLOCK INDEX NUMBER 558 | | MTC DEVICE SPECIFIC TFI 556 | | M | E |
| LENGTH INDICATOR 554 | | | | M | E |
| SUB-BLOCK INDEX NUMBER 558 | | MTC DEVICE SPECIFIC TFI 556 | | M | E |
| ... | | | | | |
| LENGTH INDICATOR 554 | | | | M | E |
| SUB-BLOCK INDEX NUMBER 558 | | MTC DEVICE SPECIFIC TFI 556 | | M | E |
| MTC DATA | | | | | |

- 402 COMMON HEADER
- 406 MAC DEVICE SPECIFIC HEADER
- 408 MAC DEVICE SPECIFIC DATA UNIT

FIG. 5B

| PAYLOAD TYPE | RRBP | S/P | USF | | |
|---|---|---|---|---|---|
| PR | | GROUP TFI 552 | | | FBI |
| | BSN | | | | E |
| LENGTH INDICATOR 554 | | MTC DEVICE SPECIFIC TFI 556 | | M | E |
| SUB-BLOCK INDEX NUMBER 558 | | SPARE 575 | | M | E |
| LENGTH INDICATOR 554 | | MTC DEVICE SPECIFIC TFI 556 | | M | E |
| SUB-BLOCK INDEX NUMBER 558 | | SPARE 575 | | M | E |
| | | ... | | | |
| LENGTH INDICATOR 554 | | MTC DEVICE SPECIFIC TFI 556 | | M | E |
| SUB-BLOCK INDEX NUMBER 558 | | SPARE 575 | | M | E |
| MTC DATA | | | | | |

402 COMMON HEADER
406 MAC DEVICE SPECIFIC HEADER
408 MAC DEVICE SPECIFIC DATA UNIT

FIG.5C

METHOD AND APPARATUS FOR MULTIPLEXING MACHINE TYPE COMMUNICATION DATA OF MULTIPLE MTC DEVICES IN A WIRELESS NETWORK ENVIRONMENT

PRIORITY

This application is a National Stage application under 35 U.S.C. § 371 of an International application filed on Oct. 13, 2011 and assigned application No. PCT/KR2011/007639, and claims the benefit under 35 U.S.C. § 365(b) of an Indian patent application filed on Oct. 13, 2010 in the Indian Intellectual Property Office and assigned Serial No. 3029/CHE/2010, the entire disclosure of which is hereby incorporated by reference.

BACKGROUND OF THE INVENTION

1. Field of the Invention

The present invention relates to the field of machine-to-machine communication. More particularly, the present invention relates to multiplexing Machine Type Communication (MTC) data of MTC devices in a wireless network environment.

2. Description of the Related Art

A Global System for Mobile communications (GSM) Enhanced Data rates for GSM Evolution (EDGE) Radio Access Network (GERAN) is a type of a wireless network that supports legacy devices as well as MTC devices to communicate Packet Switched (PS) data with a core network or an MTC server via a base station.

Machine-to-Machine (M2M) communication (also referred to as "machine-type communication" or "MTC") is a form of data communication between devices (i.e., MTC devices) that do not necessarily need human interaction unlike legacy devices. For example, in an M2M communication, an MTC device (such as a sensor or smart-meter) may capture event data which is relayed through a base station to an application residing in an MTC server for analysis and necessary action. M2M communication may be used in a variety of areas, such as smart metering systems (e.g., in applications related to power, gas, water, heating, grid control, and industrial metering), surveillance systems, order management, gaming machines, health care communication, and the like. Additionally, M2M communication based on MTC technology may be used in areas such as customer service.

Typically in GERAN, each base station exchanges PS data with one or more MTC devices over four non-contiguous time slots in four frames of a single radio block period. For example, a Packet Data Unit (PDU) associated with an MTC device may contain small burst of PS data (e.g., 20 bytes). The small data burst of PS data is typically split into four PS data bursts and each PS data burst is transmitted in each allocated time slot of the frame in the single radio block period. Since PS data sent/received to/from the MTC device is of a small size, a large number of resources are consumed to handle small sized data transfers if a single radio block period is used for sending MTC data associated with one MTC device. This may pose a strain on radio resources available in the wireless network and also lead to inefficient utilization of radio resources in the wireless network environment.

Therefore, a need exists for a method and a system of multiplexing MTC data of multiple MTC devices in a single radio block period.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages below. Accordingly, an aspect of the present invention is to provide a method and a system of multiplexing Machine Type Communication (MTC) data of multiple MTC devices in a single radio block period.

In accordance with an aspect of the present invention, a method of multiplexing MTC data of multiple MTC devices in a wireless network environment is provided. The method includes providing, by a base station, resource information to a plurality of MTC devices, wherein the resource information includes a time slot allocated to the plurality of MTC devices in each frame of a radio block period, a Temporary Flow Identifier (TFI), and sub-block index information, packing MTC data associated with each of the plurality of MTC devices in a data packet, and multiplexing the data packet including the MTC data associated with the plurality of MTC devices in downlink over the time slot allocated in each frame of the radio block period.

In accordance with another aspect of the present invention, an apparatus is provided. The apparatus includes a processor, and a memory coupled to the processor, wherein the memory includes an MTC data multiplexing module configured for providing resource information to a plurality of MTC devices, wherein the resource information includes a time slot allocated to the plurality of MTC devices in each frame of a radio block period, a TFI, and sub-block index information, packing MTC data associated with each of the plurality of MTC devices in a data packet, and multiplexing the data packet including the MTC data associated with the plurality of MTC devices in downlink over the time slot allocated in each frame of the radio block period.

In accordance with another aspect of the present invention, a method of multiplexing MTC data of multiple MTC devices in a wireless network environment is provided. The method includes receiving a packet channel request from an MTC device belonging to a group of MTC devices, providing, by a base station, resource information to MTC devices belonging to the group of MTC devices in response to the packet channel request, wherein the resource information includes at least one time slot allocated to each of the MTC devices in a radio block period, Uplink Status Flag (USF) information, and burst level allocation information, and receiving a data block from each of the MTC devices in uplink over the at least one time slot allocated in the radio block period based on the USF information and the burst level allocation information.

In accordance with another aspect of the present invention, an apparatus is provided. The apparatus includes a processor, and a memory coupled to the processor, wherein the memory includes an MTC data multiplexing module capable of receiving a packet channel request from an MTC device belonging to a group of MTC devices for providing resource information to MTC devices belonging to the group of MTC devices in response to the packet channel request, wherein the resource information includes at least one time slot allocated to each of the MTC devices in a radio block period, USF information, and burst level allocation information, and receiving a data block from each of the MTC devices in uplink over the at least one time slot allocated in the radio block period based on the USF information and the burst level allocation information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features, and advantages of the present invention will be more apparent from the following description taken in conjunction with the accompanying drawings, in which:

FIG. 5B is a schematic diagram illustrating a data packet format for a GPRS connection according to an exemplary embodiment of the present invention;

FIG. 5C is a schematic diagram illustrating a data packet format for a GPRS connection according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and a system of multiplexing Machine Type Communication (MTC) data of multiple MTC devices in a single radio block period.

Figure 1:
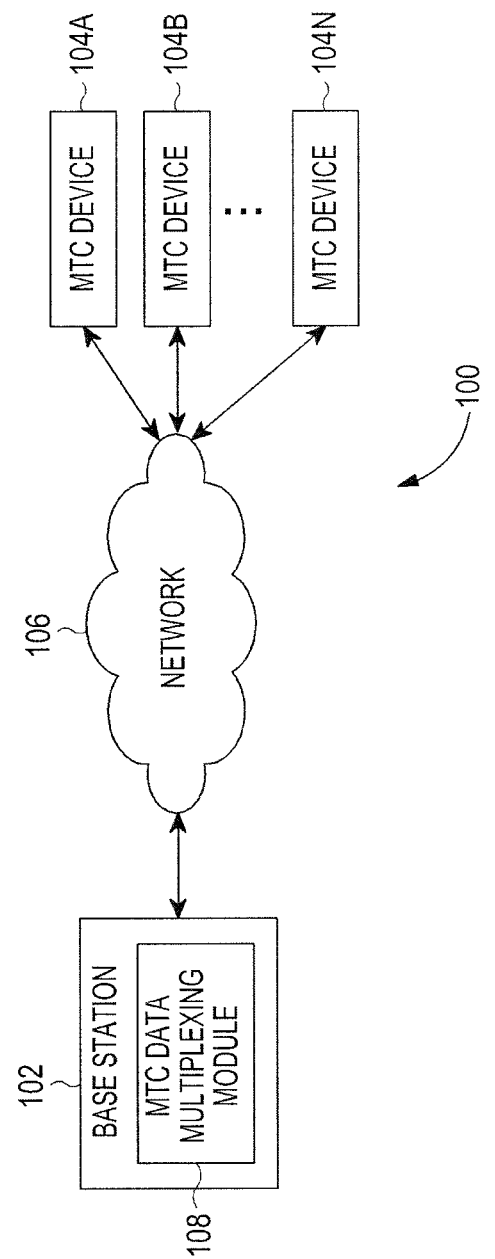
FIG. 1 illustrates a block diagram of a wireless communication system capable of multiplexing Machine Type Communication (MTC) data of multiple MTC devices over a radio block period according to an exemplary embodiment of the present invention.

FIG. 1 illustrates a block diagram of a wireless communication system capable of multiplexing MTC data of multiple MTC devices over a radio block period according to an exemplary embodiment of the present invention.

Referring to FIG. 1, a system 100 includes a base station 102 and MTC devices 104A-N connected to the base station 102 via a wireless network 106 (e.g., a packet switched network). The base station 102 includes an MTC data multiplexing module 108 for multiplexing MTC data of multiple MTC devices 104A-N over a radio block period.

Consider that the base station 102 has MTC data to be transmitted to the MTC devices 104A-N in downlink. In such case, the MTC data multiplexing module 108 allocates a time slot(s) in each frame of a radio block period to the multiple MTC devices 104A-N. Accordingly, the MTC data multiplexing module 108 communicates the allocated time slot(s), a Temporary Flow Identifier (TFI) and sub-block index information to the MTC devices 104A-N. The MTC data multiplexing module 108 multiplexes the MTC data in a data packet to the MTC devices 104A-N in downlink over the allocated time slot(s) in each frame of the radio block period. Each of the MTC devices 104A-N can retrieve the associated MTC data using the TFI and the sub-block index information in the data packet. The process steps performed by the MTC data multiplexing module 108 for multiplexing MTC data in downlink is described in FIG. 2.

Now in uplink, when the MTC devices 104A-N has MTC data to be transmitted to the base station 102, an MTC device in a group of MTC devices 104A-N sends a packet channel request to the base station 102 indicating that it has MTC data to be transmitted. The group of MTC devices 104A-N is pre-defined or formed by the MTC data multiplexing module 108 based on a number of active MTC devices at a given instance. Based on the request, the MTC data multiplexing module 108 allocates resources to each of the MTC devices 104A-N belonging to the group. The resource information includes at least one time slot allocated to each of the MTC devices 104A-N in a radio block period, Uplink Status Flag (USF) information, and burst level allocation information. Based on the USF information and the burst level allocation information, each of the MTC devices 104A-N transmits a data block to the base station 102 over the allocated time slot in the radio block period. In this manner, the MTC data multiplexing module 108 enables multiple MTC devices 104A-N to transmit MTC data bursts in the MTC data block based on a burst number and a time slot allocated to the MTC devices 104A-N in a single radio block period. The process steps performed by the MTC data multiplexing module 108 for multiplexing MTC data in uplink is described in FIG. 3.

Figure 2:
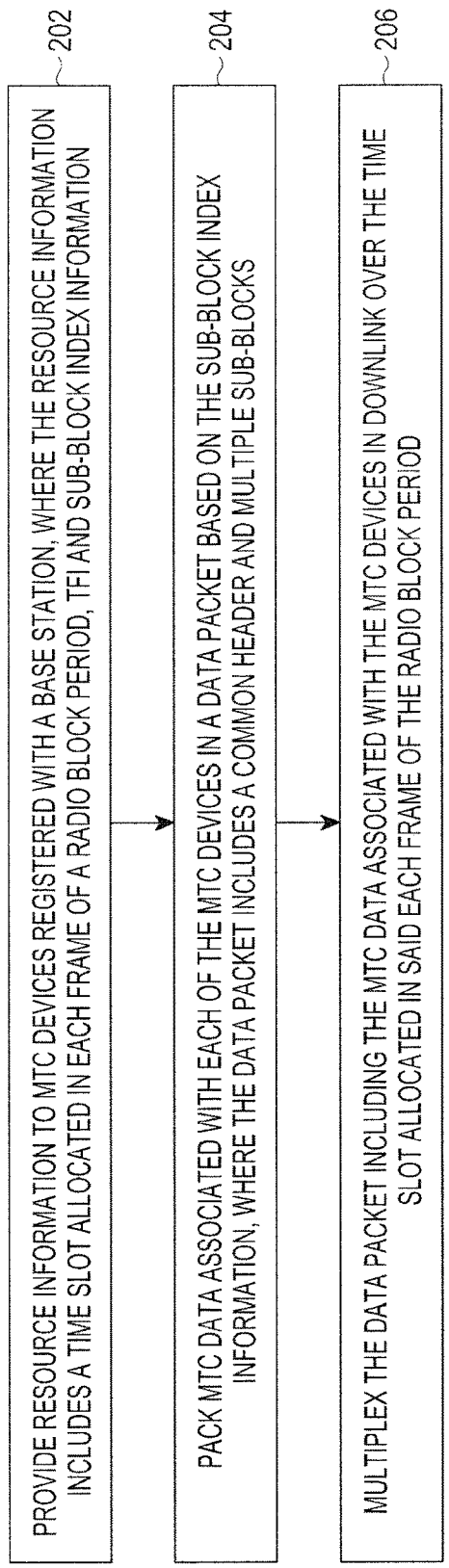
FIG. 2 is a flowchart illustrating an exemplary method of multiplexing MTC data associated with MTC devices in downlink according to an exemplary embodiment of the present invention.

FIG. 2 is a flowchart illustrating an exemplary method of multiplexing MTC data associated with MTC devices in downlink according to an exemplary embodiment of the present invention.

Referring to FIG. 2, at step 202, resource information is provided to the MTC devices 104A-N registered with the base station 102. The resources are allocated such that MTC data is transmitted to the multiple MTC devices 104A-N in downlink over a single radio block period. The resource information communicated to the MTC devices 104A-N includes a time slot allocated to the MTC devices 104A-N in each frame of a radio block period, TFI information, and sub-block index information. For example, a radio block period may transmit four frames, each frame having eight time slots. The resources information indicates a timeslot allocated to the MTC devices 104A-N in each of the four frames of the radio block period. The TFI information includes a user specific TFI assigned to each of the MTC devices 104A-N and/or a group TFI assigned to the MTC devices 104A-N which are members of an MTC group. The sub-block index information is indicative of a sub-index number of a sub-block which contains MTC data associated with one of the MTC devices 104A-N.

When the base station 102 has data for the MTC devices 104A-N, the base station 102 transmits the MTC data to the MTC devices 104A-N based on the allocated resources as described in steps 204 and 206. At step 204, the MTC data associated with each of the MTC devices 104A-N is packed in a data packet based on the sub-block index information. According to exemplary embodiments of the present invention, the data packet includes a common header and/or multiple sub-blocks. Each of the multiple sub-blocks is associated with one of the MTC devices 104A-N and includes MTC device specific header and an MTC device specific data unit. In some exemplary embodiments of the present invention, the MTC data associated with each of the MTC devices 104A-N is packed in an MTC specific data unit of at least one sub-block. In these exemplary embodiments of the present invention, a sub-block index number of the at least one sub-block is encoded in the corresponding MTC device specific header. The sub-block index number indicates presence of the MTC data associated with a particular MTC device in the associated MTC specific data unit. Thus, the MTC device determines whether the MTC data in the MTC device specific header is intended for it if the sub-block index number in the MTC specific header matches the one indicated in the sub-index information provided in a resource allocation message. Alternatively, when the MTC user specific header is not present in the sub-block, the MTC device directly obtains MTC data from the MTC device specific data unit of the same sub-block indicated by the sub-block index information in the resource allocation message.

At step 206, the data packet including the MTC data associated with the MTC devices 104A-N is multiplexed in downlink over the time slot allocated in each frame of the radio block period. In some exemplary embodiments of the present invention, the data packet including the MTC data is processed at the PHY layer and stripped into small data chunks. In these exemplary embodiments of the present invention, each data chunk is transmitted over the allocated time slot in each frame. Each of the MTC devices 104A-N, upon receiving the data chunk, checks the TFI in the common header. If TFI in the common header matches with the TFI provided in the resource allocation message, each of the MTC devices 104A-N obtains the sub-index number from the MTC device specific header and determines whether the corresponding MTC device specific data unit includes the MTC data intended for it. As described above, each MTC device confirms that the corresponding MTC device specific data unit includes its MTC data if the sub-block index number matches with the sub-block index number in the sub-block index information.

Figure 3:
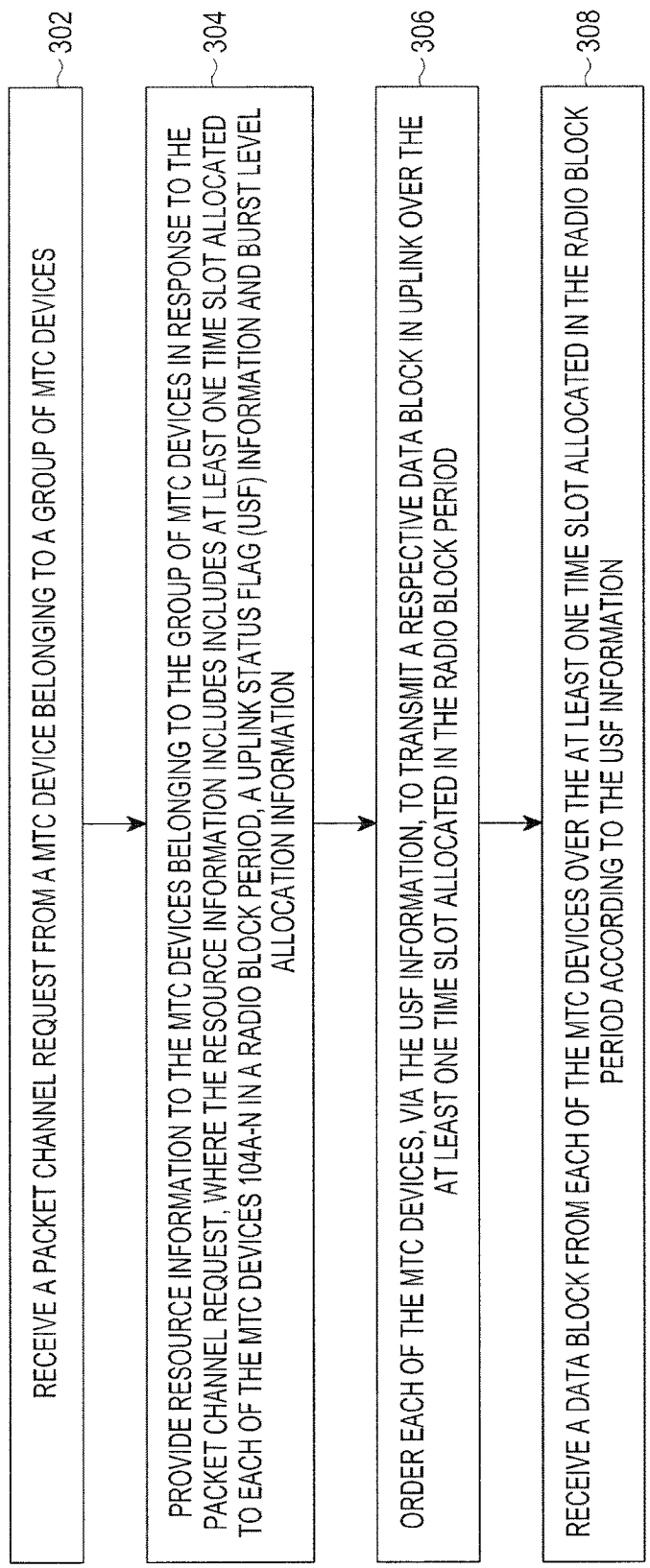
FIG. 3 is a flowchart illustrating an exemplary method of multiplexing MTC data by MTC devices in uplink over a single radio block period according to an exemplary embodiment of the present invention.

FIG. 3 is a flowchart illustrating an exemplary method of multiplexing MTC data by MTC devices in uplink over a single radio block period according to an exemplary embodiment of the present invention.

Referring to FIG. 3, at step 302, a packet channel request is received from an MTC device 104A belonging to a group of MTC devices 104A-N. The packet channel request includes a random reference number which is a function of a group identifier associated with the group of MTC devices 104A-N, a subscriber identifier associated with the MTC device 104A, and a random number. In an exemplary embodiment of the present invention, the MTC device 104A performs contention resolution by including a random reference in the packet channel request.

At step 304, resource information is provided to the MTC devices 104A-N belonging to the group of MTC devices 104A-N in response to the packet channel request. The resources are allocated such that the multiple MTC devices 104A-N transmits MTC data in uplink over a single radio block period. The resource information communicated to the MTC devices 104A-N includes at least one time slot allocated to each of the MTC devices 104A-N in a radio block period, USF information, and burst level allocation information. For example, a radio block period may contain four frames, each frame having eight time slots. The resources information indicates at least one timeslot allocated to each of the MTC devices 104A-N in the radio block period. The USF information includes a USF specific to each of the MTC devices 104A-N or a common USF associated with the group of MTC devices 104A-N. The burst level allocation information may contain two bit information (i.e., ranging from 0 to 3) which indicates a burst number or a sub-block index number allocated to each of the MTC devices 104A-N for transmitting MTC data block(s) in uplink. The burst level allocation information is communicated via resource allocation messages or via resource re-allocation messages, such as PACKET UPLINK ASSIGNMENT/PACKET TIMESLOT RECONFIGURE/IMMEDIATE ASSIGNMENT messages.

At step 306, each of the MTC devices 104A-N are ordered, via the USF information, to transmit a respective data block in uplink over the at least one time slot allocated in the radio block period. Thus, when each of the MTC devices 104A-N has MTC data to be transmitted to the base station 102, each of the MTC devices 104A-N transmits the MTC data in uplink over the at least one time slot allocated in the radio block period based on the burst level allocation information. Accordingly, at step 308, data block(s) containing MTC data is received from each of the MTC devices 104A-N over the at least one time slot allocated in the radio block period. The data block received from each of the MTC devices 104A-N includes an MTC data burst and a TFI.

Figure 4A:
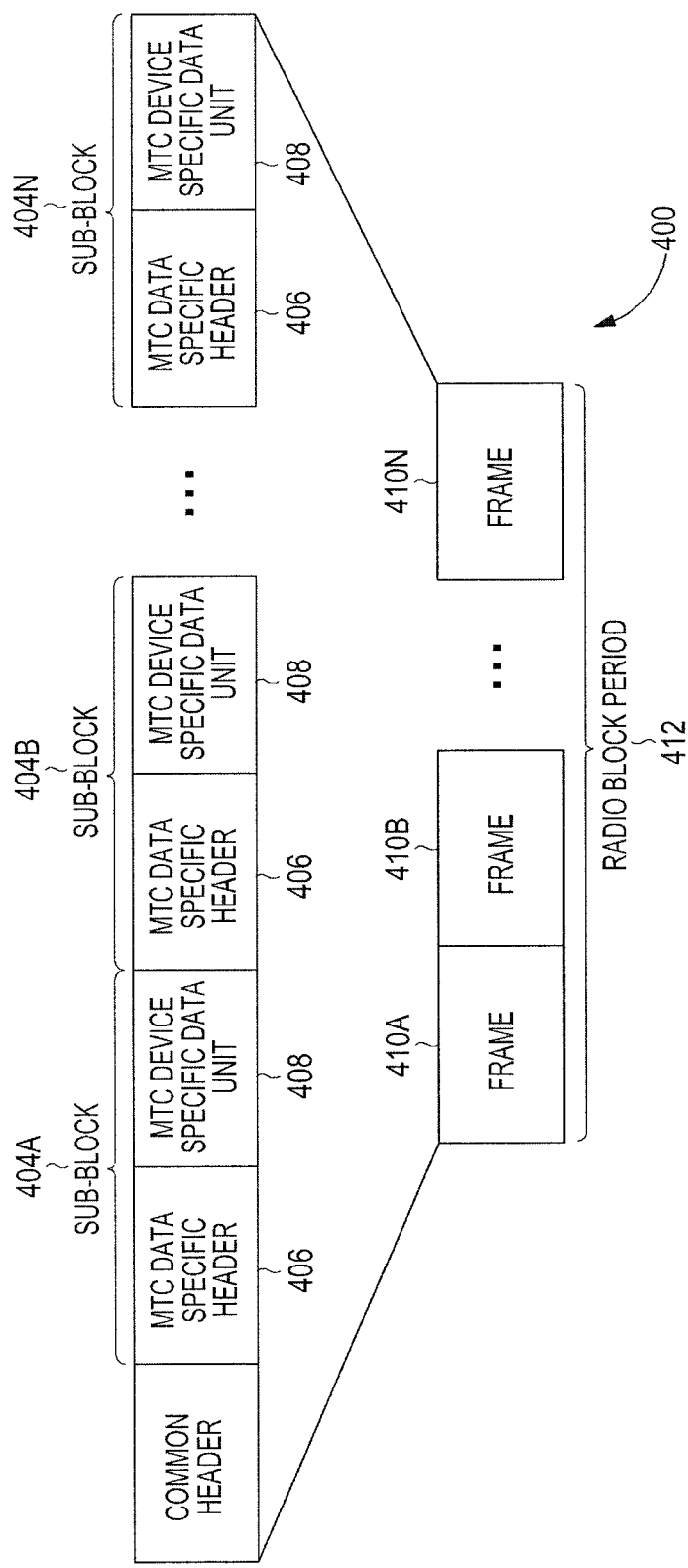
FIG. 4A is a schematic representation of an exemplary data packet containing MTC data of multiple MTC devices multiplexed over a single radio block period according to an exemplary embodiment of the present invention.

FIG. 4A is a schematic representation of an exemplary data packet containing MTC data of multiple MTC devices multiplexed over a single radio block period according to an exemplary embodiment of the present invention.

Referring to FIG. 4A, a data packet 400 includes a common header 402 and multiple sub-blocks 404A-N. The common header 402 includes a Medium Access Control (MAC) header carrying a group TFI and a mandatory portion of Radio Link Control (RLC) header. Each of the multiple sub-blocks 404A-N is associated with one of the MTC devices 104A-N and includes MTC device specific header 406 and an MTC device specific data unit 408. The MTC device specific data unit 408 carries MTC data associated with a particular MTC device. The MTC device specific header 406 carries an MTC device specific TFI, and a sub-block index number of the corresponding sub-block, which in conjunction indicates presence of the MTC data associated with the particular MTC device in the associated MTC specific data unit 408. The data packet 400 including the common header 402 and the sub-blocks 404A-N are multiplexed to the MTC devices 104A-N in four frames 410A-N of a radio block period 412.

Figure 4B:
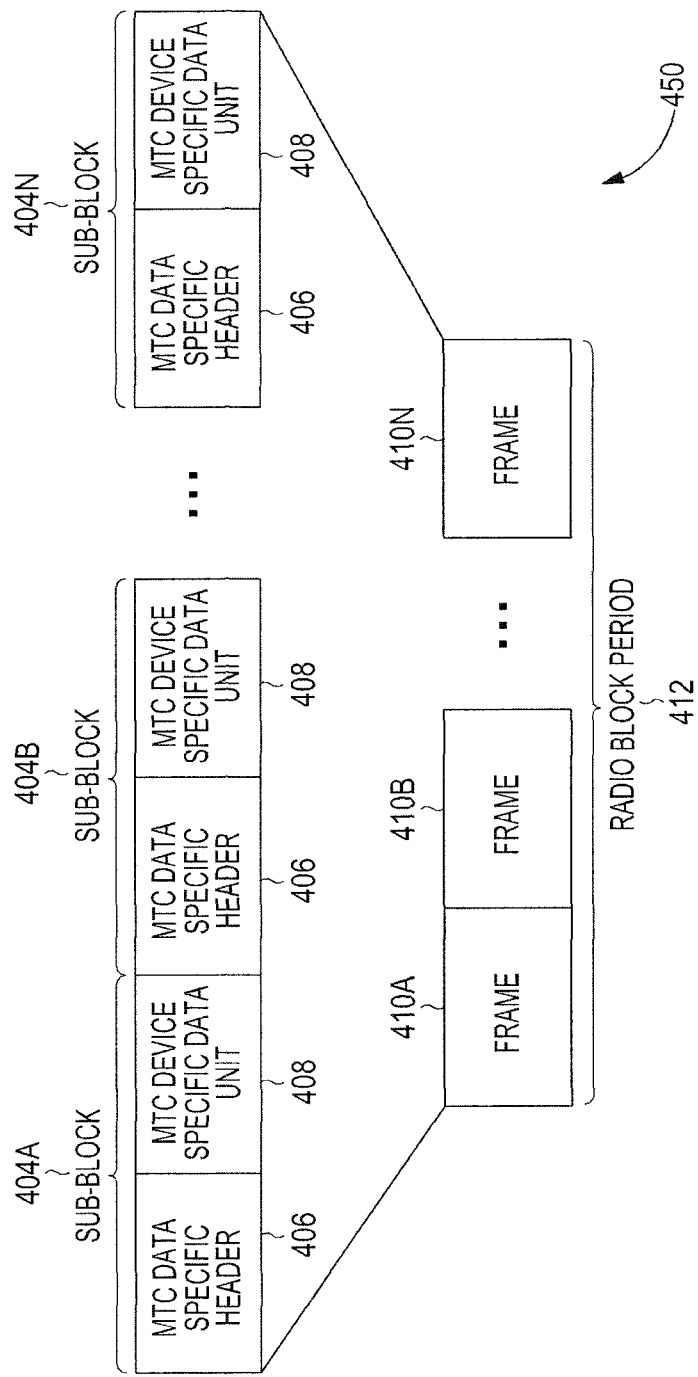
FIG. 4B is a schematic representation of an exemplary data packet containing MTC data of multiple MTC devices multiplexed over a single radio block period according to another exemplary embodiment of the present invention.

FIG. 4B is a schematic representation of an exemplary data packet containing MTC data of multiple MTC devices multiplexed over a single radio block period according to an exemplary embodiment.

Referring to FIG. 4B, a data packet 450 of FIG. 4B is the same as the data packet 400 of FIG. 4A, except the data packet 450 does not contain the common header 402.

Figure 5A:
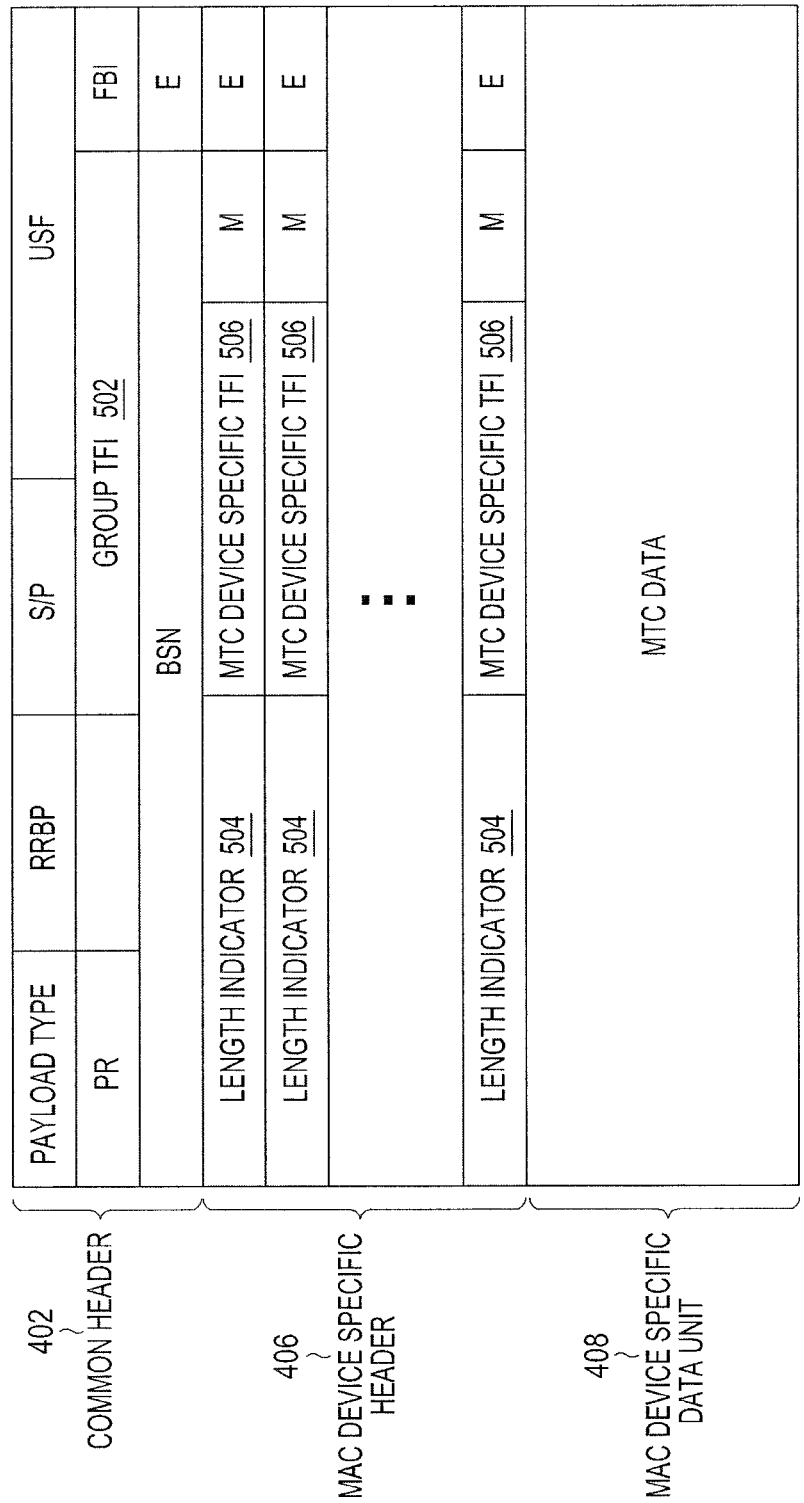
FIG. 5A is a schematic diagram illustrating a data packet format for a General Packet Radio Service (GPRS) connection according to an exemplary embodiment of the present invention.

FIG. 5A is a schematic diagram illustrating a data packet format for a General Packet Radio Service (GPRS) connection according to an exemplary embodiment of the present invention.

Referring to FIG. 5A, the common header 402 includes a group TFI field 502 for carrying group TFI associated with the MTC devices 104A-N. The MTC device specific header 406 in each of the sub-blocks 404A-N includes the length indicator field 504 indicating length of MTC data associated with a particular MTC device and an MTC device specific TFI field 506 for carrying an MTC device specific TFI associated with one of the MTC devices 104A-N. The length indicator field 504 and the MTC device specific TFI field 506 are 3 bits in size. Other fields in the data packet 400 are similar to an RLC data packet known in the art and hence the explanation is thereof omitted.

FIG. 5B is a schematic diagram illustrating a data packet format for a GPRS connection according to an exemplary embodiment of the present invention.

Referring to FIG. 5B, the common header 402 includes a group TFI field 552 for carrying group TFI associated with the MTC devices 104A-N. The MTC device specific header 406 in each of the sub-blocks 404A-N includes a length indicator field 554 for carrying length of the MTC data associated with a particular MTC device and an MTC device specific TFI field 556 for carrying an MTC device specific TFI associated with one of the MTC devices 104A-N. The MTC device specific header 406 also includes a sub-block index field 558 indicating a sub-block index number of the corresponding sub-block 404. Other fields in the data packet 400 are similar to an RLC data packet known in the art and hence the explanation is thereof omitted.

FIG. 5C is a schematic diagram illustrating a data packet format for a GPRS connection according to an exemplary embodiment of the present invention.

Referring to FIG. 5C, its schematic diagram is similar to the schematic diagram of FIG. 5B, except in the schematic diagram of FIG. 5C, the MTC device specific header 406 includes a spare bit field 575 when the length indicator field 554 need not be of 6 bits. The spare bit field 575 may be two bits in size. In an exemplary embodiment of the present invention, the two bits can be used to indicate TFI increment value from a TFI available in the MTC device specific header, thereby accommodating more than one MTC data bursts in a single sub-block. In another exemplary embodiment of the present invention, the spare bit field 575 is used to indicate multiple user TFIs when multiple MTC devices 104A-N are multiplexed in the downlink.

Figure 6A:
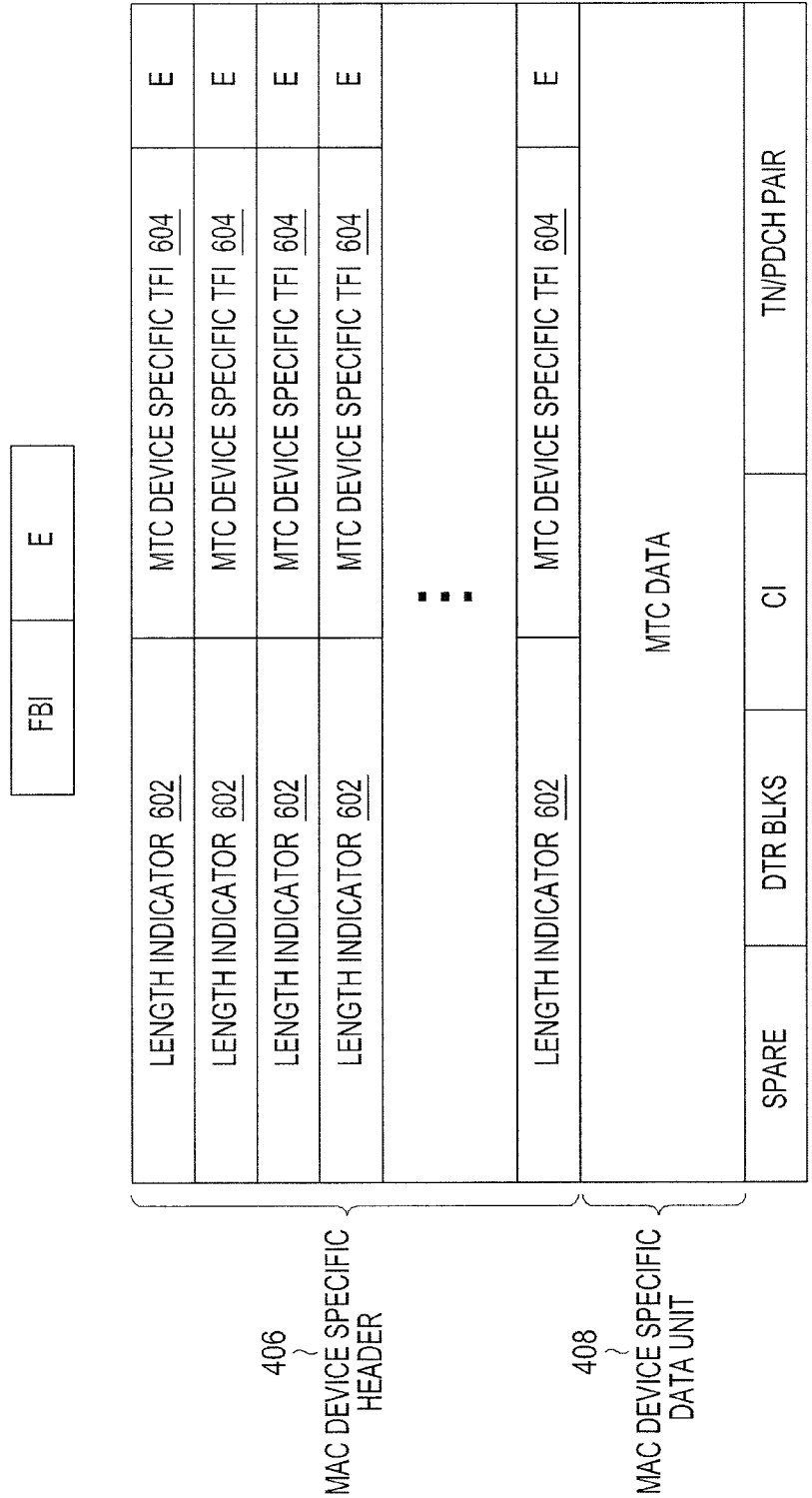
FIG. 6A is a schematic diagram illustrating a data packet format for an Enhanced-GPRS (E-GPRS) connection according to an exemplary embodiment of the present invention.

FIG. 6A is a schematic diagram illustrating a data packet format for an Enhanced-GPRS (E-GPRS) connection according to an exemplary embodiment of the present invention.

Referring to FIG. 6A, the MTC device specific header 406 in each of the sub-blocks 404A-N includes a length indicator field 602 indicating length of MTC data associated with a particular MTC device and a user TFI field 604 for carrying a user TFI associated with one of the MTC devices 104A-N. Other fields in the data packet 400 are similar to an RLC data packet known in the art and hence the explanation is thereof omitted. One can envision that the data packet 400 for E-GPRS can include a sub-block index field and/or a spare bit field similar to the data packet formats illustrated in FIGS. 5B and 5C.

Figure 6B:
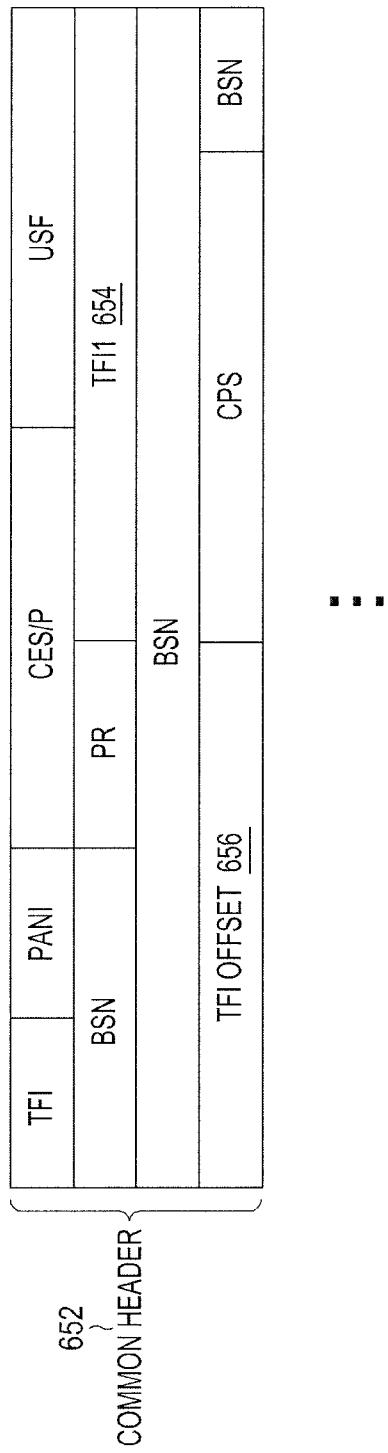
FIG. 6B is a schematic diagram illustrating a data packet format for an E-GPRS connection according to an exemplary embodiment of the present invention.

FIG. 6B is a schematic diagram illustrating a data packet format for an E-GPRS connection according to an exemplary embodiment of the present invention.

Referring to FIG. 6B, the data packet format indicates a common header 652 of the data packet 400 for E-GPRS connection. The common header 652 includes a TFI1 field 654 and TFI offset field 656. The TFI1 field 654 indicates a TFI assigned to a specific MTC device while the TFI1 field 654 and the TFI offset field 656 indicate a TFI assigned to another MTC device. The TFI assigned to another MTC device is obtained when the value in the TFI1 field 654 is read in conjunction with the value in the TFI offset field 656.

Figure 7:
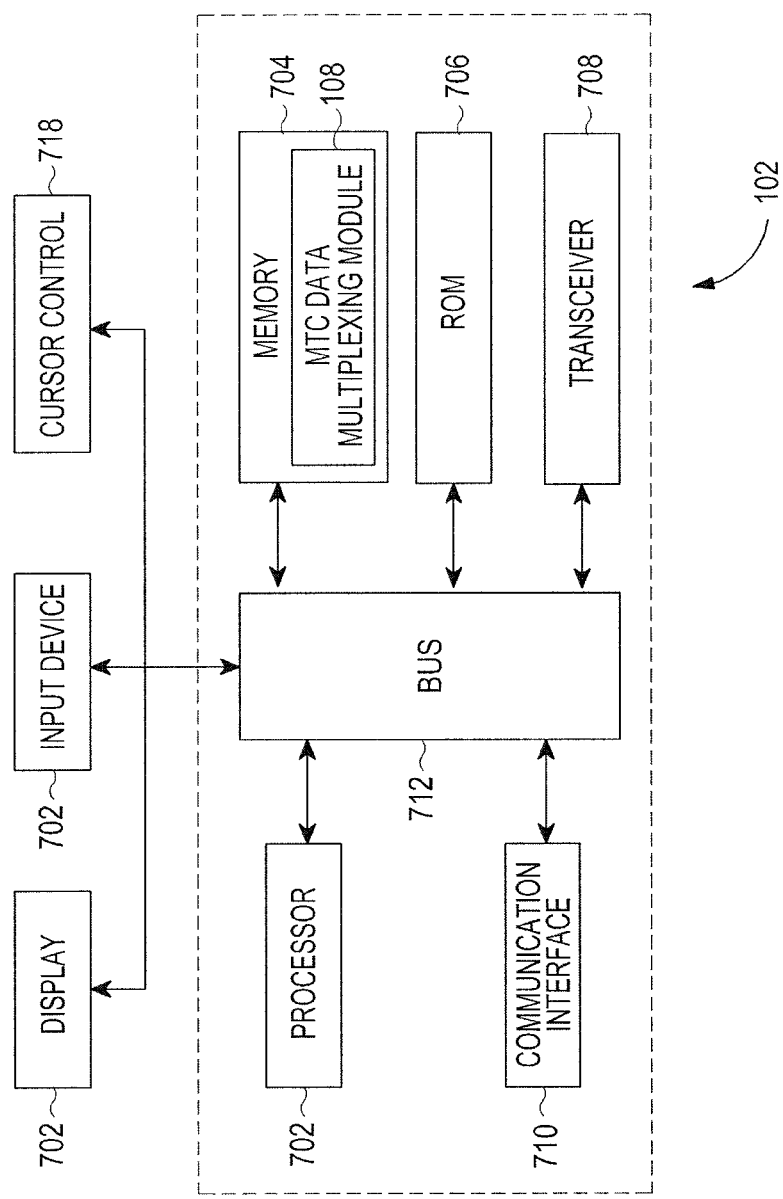
FIG. 7 illustrates a block diagram of a base station showing various components according to an exemplary embodiment of the present invention.

FIG. 7 illustrates a block diagram of a base station showing various components according to an exemplary embodiment of the present invention.

Referring to FIG. 7, a base station 102 includes a processor 702, a memory 704, a Read Only Memory (ROM) 706, a transceiver 708, a communication interface 710, a bus 712, a display 714, an input device 716, and a cursor control 718.

The processor 702, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, smart cards, and the like.

The memory 704 may be a volatile memory and a non-volatile memory. The memory 704 includes the MTC data multiplexing module 108 for multiplexing MTC data associated with multiple MTC devices 104A-N over a single radio block period, according to exemplary embodiments illustrated in FIGS. 1-6. A variety of computer-readable storage media may be stored in and accessed from the memory elements. Memory elements may include any suitable memory device(s) for storing data and machine-readable instructions, such as a read only memory, a random access memory, an erasable programmable read only memory, an electrically erasable programmable read only memory, a hard drive, a removable media drive for handling memory cards, Memory Sticks™, and the like.

Exemplary embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 702. For example, a computer program may include machine-readable instructions capable of multiplexing the MTC data associated with the multiple MTC devices 104A-N over a single radio block period, according to the teachings and herein described exemplary embodiments of the present subject matter. In an exemplary embodiment of the present invention, the computer program may be included on a storage medium and loaded from the storage medium to a hard drive in the non-volatile memory.

It is appreciated that, the components, such as the transceiver 708, the communication interfaces 710, the display 714, the input device 716, and the cursor control 718, are well known to the person skilled in the art and hence the explanation thereof is omitted.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method of multiplexing machine type communication (MTC) data of multiple MTC devices in a wireless network environment, the method comprising:
   providing, by a base station, resource information to a plurality of MTC devices, wherein the resource information includes a time slot allocated to each of the plurality of MTC devices in each frame of a radio block period, a temporary flow identifier (TFI), and sub-block index information;
   packing MTC data associated with each of the plurality of MTC devices in a data packet; and
   multiplexing the data packet including the MTC data associated with each of the plurality of MTC devices in downlink over the time slot allocated in each frame of the radio block period,
   wherein the data packet comprises multiple sub-blocks and a common header which is common to the multiple sub-blocks,
   wherein each of the multiple sub-blocks is associated with one of the plurality of MTC devices,
   wherein the common header includes a first group TFI for the plurality of the MTC devices,
   wherein a sub-block of the multiple sub-blocks comprises an MTC device specific header including a first user specific TFI for a MTC device which is associated with the sub-block, and
   wherein the MTC device specific header further includes a field indicating a TFI increment value.

2. The method of claim 1, wherein each of the multiple sub-blocks comprises an MTC device specific data unit.

3. The method of claim 2, wherein the packing of the MTC data associated with each of the plurality of MTC devices in the data packet comprises:
   packing MTC data associated with each of the plurality of MTC devices in an MTC specific data unit of at least one of the multiple sub-blocks; and
   encoding a sub-block index number of the at least one of the multiple sub-blocks in the MTC device specific header.

4. The method of claim 3, wherein the sub-block index number indicates presence of the MTC data associated with one of the plurality of MTC devices in the at least one of the multiple sub-blocks.

5. The method of claim 4, wherein the sub-block index information is indicative of a sub-index number of the at least one of the multiple sub-blocks which contains the MTC data associated with one of the plurality of MTC devices.

6. The method of claim 5, wherein the TFI comprises a second user specific TFI assigned to each of the plurality of MTC devices and a second group TFI assigned to the plurality of MTC devices.

7. An apparatus comprising:
   at least one processor; and
   a memory coupled to the at least one processor,
   wherein the memory includes a machine type communication (MTC) data multiplexer configured for:
      providing resource information to a plurality of MTC devices, wherein the resource information includes a time slot allocated to each of the plurality of MTC devices in each frame of a radio block period, a temporary flow identifier (TFI), and sub-block index information,
      packing MTC data associated with each of the plurality of MTC devices in a data packet, and
      multiplexing the data packet including the MTC data associated with each of the plurality of MTC devices in downlink over the time slot allocated in each frame of the radio block period,
   wherein the data packet comprises multiple sub-blocks and a common header which is common to the multiple sub-blocks,
   wherein each of the multiple sub-blocks is associated with one of the plurality of MTC devices,
   wherein the common header includes a first group TFI for the plurality of the MTC devices,
   wherein a sub-block of the multiple sub-blocks comprises an MTC device specific header including a first user specific TFI for a MTC device which is associated with the sub-block, and
   wherein the MTC device specific header further includes a field indicating a TFI increment value.

8. The apparatus of claim 7, wherein each of the multiple sub-blocks comprises an MTC device specific data unit.

9. The apparatus of claim 8, wherein the MTC data multiplexer is configured for:
   packing MTC data associated with each of the plurality of MTC devices in an MTC specific data unit of at least one of the multiple sub-blocks; and
   encoding a sub-block index number of the at least one of the multiple sub-blocks in the MTC device specific header.

10. The apparatus of claim 9, wherein the sub-block index number indicates presence of the MTC data associated with one of the plurality of MTC devices in the at least one of the multiple sub-blocks.

11. The apparatus of claim 10, wherein the sub-block index information is indicative of a sub-index number of the at least one of the multiple sub-blocks which contains the MTC data associated with one of the plurality of MTC devices.

12. The apparatus of claim 11, wherein the TFI comprises a second user specific TFI assigned to each of the plurality of MTC devices and a second group TFI assigned to the plurality of MTC devices.

* * * * *